W. BAILEY.
HARVESTER.
APPLICATION FILED DEC. 29, 1917.
1,286,906.
Patented Dec. 10, 1918.
3 SHEETS—SHEET 3.
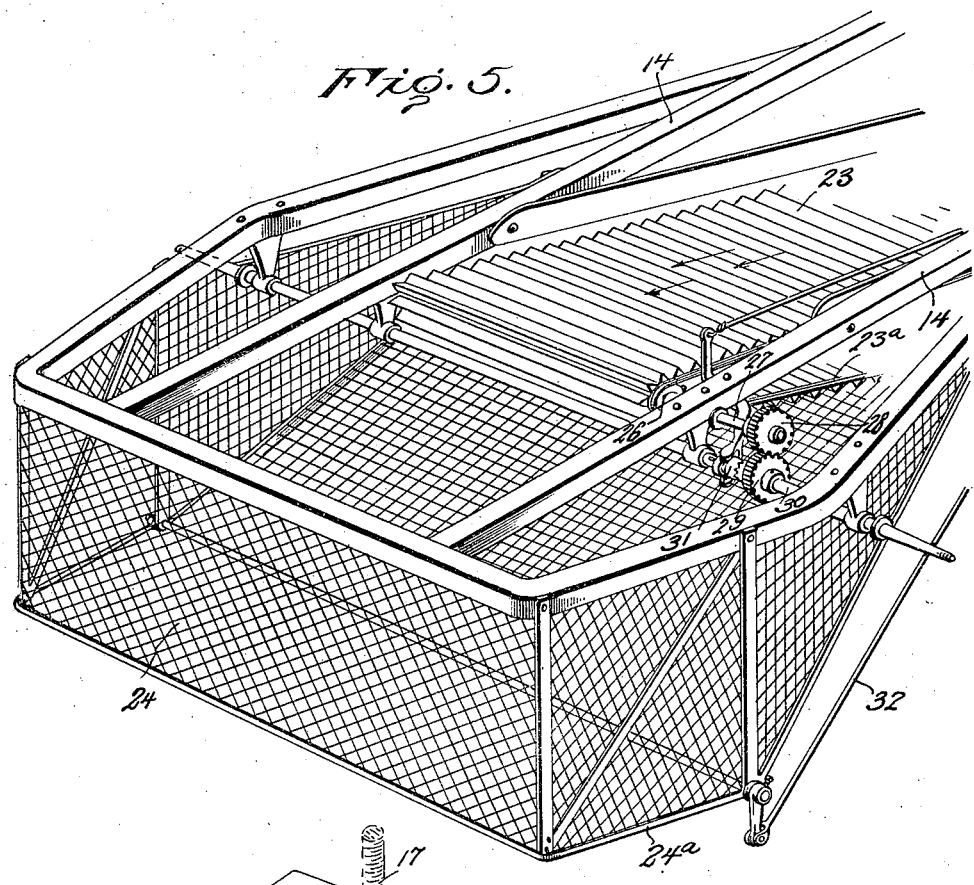
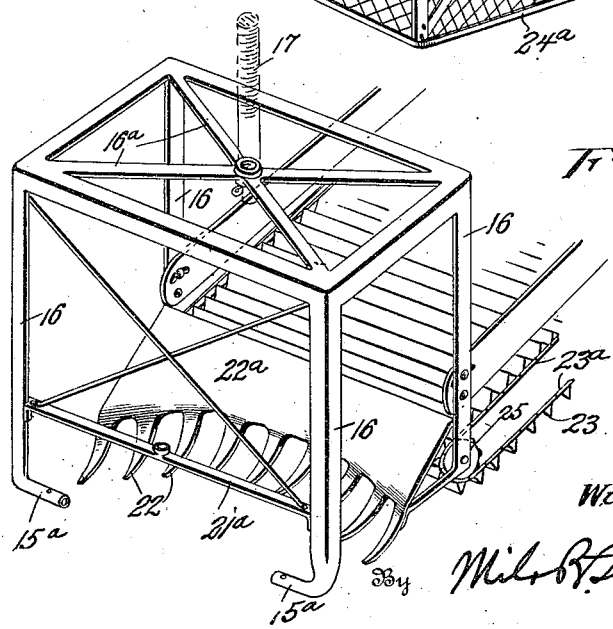
Inventor
William Bailey.

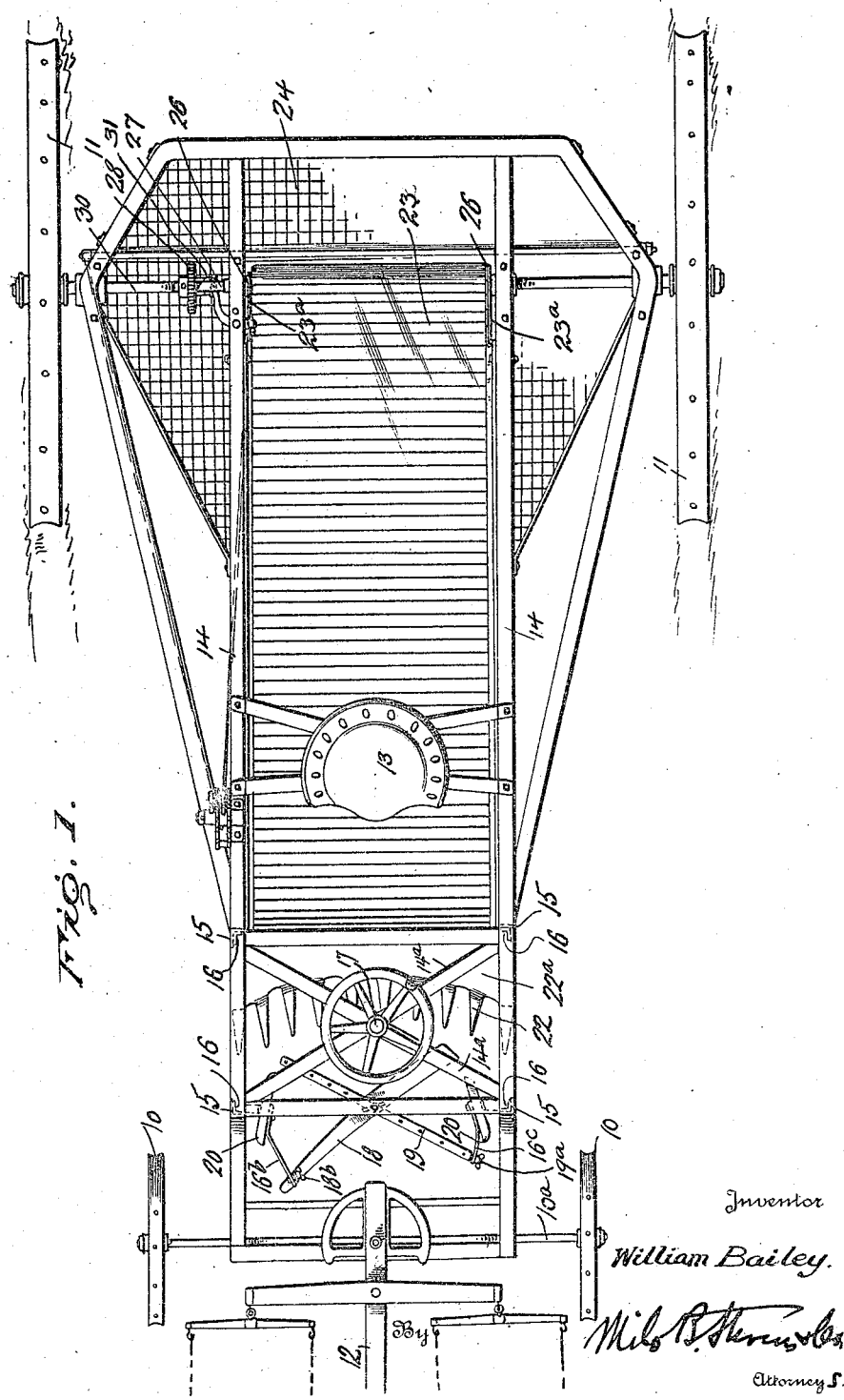

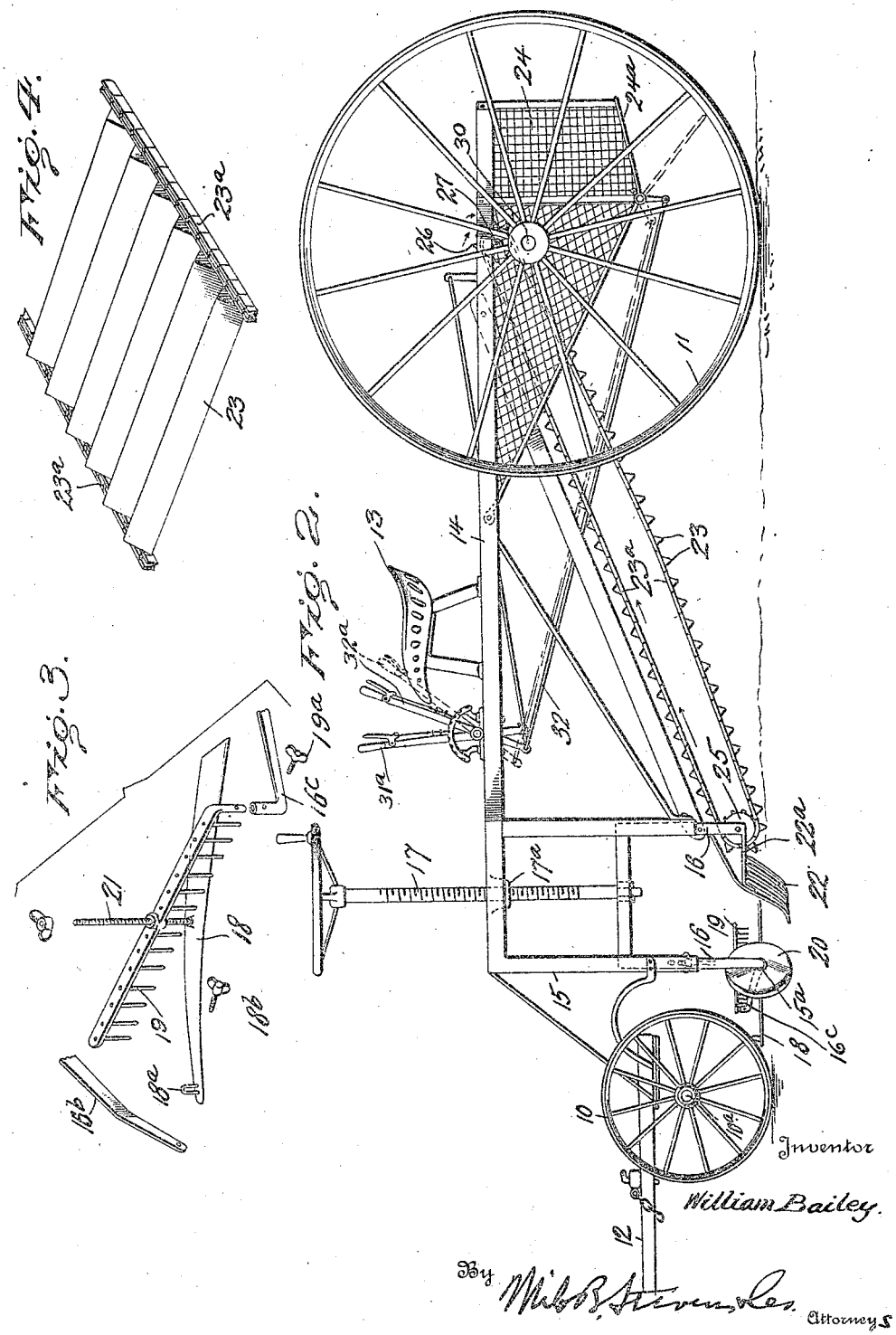

UNITED STATES PATENT OFFICE.

WILLIAM BAILEY, OF CHICAGO, ILLINOIS.

HARVESTER.

1,286,906.  Specification of Letters Patent.  Patented Dec. 10, 1918.

Application filed December 29, 1917. Serial No. 209,471.

*To all whom it may concern:*

Be it known that I, WILLIAM BAILEY, a citizen of the United States, residing at Chicago, in the county of Cook and State of Illinois, have invented new and useful Improvements in Harvesters, of which the following is a specification.

This invention relates to machines for harvesting beets, potatoes and other crops which must be dug up, and its object is to provide a simple and efficient machine of this kind which is also provided with a novel and improved means for cutting the tops off the plants before they are dug up or lifted out of the ground.

The object stated is attained by means of a combination and arrangement of parts to be hereinafter described and claimed, and in order that the same may be better understood, reference is had to the accompanying drawings forming a part of this specification.

In the drawings,

Figure 1 is a plan view of the machine;

Fig. 2 is a side elevation thereof;

Fig. 3 is a perspective view of a cutting mechanism;

Fig. 4 is a perspective view of a fragment of a conveyer;

Fig. 5 is a perspective view of the rear end of the conveyer showing a receptacle into which it discharges, and Fig. 6 is a detail in perspective showing the frame which carries the cutting and digging mechanisms.

Referring specifically to the drawings, the machine has a suitable supporting frame mounted on front and rear wheels 10 and 11, respectively. The front wheels are spaced to straddle one row of plants, and the spacing of the rear wheels is such as to straddle three rows. The front wheels are carried by a swiveled axle $10^a$ so that the machine may be guided when traveling. A draft tongue 12 is connected to the front axle and provided with the usual means for attaching the draft animals. The machine is designed to be worked with two horses. At the forward end of the frame is a seat 13 for the driver. The frame of the machine is suitably constructed and arranged to support the working parts to be presently described.

The supporting frame has laterally spaced, longitudinal side bars 14 which carry at their forward ends a frame in which is supported, and guided for vertical movement, a frame carrying certain cutting and other mechanism to be presently described. The guide frame is composed of four depending bars 15 arranged to accommodate the slidable frame, the latter being composed of four uprights 16 suitably braced together and arranged to form a rectangular frame. Vertical adjustment of the slidable frame is effected by means of a hand screw 17 connected to cross bars $16^a$ connecting the uprights 16 at the top thereof, said hand screw being threaded through a nut $17^a$ carried by cross bars $14^a$ connecting the side bars 14.

The cutter is a horizontal blade 18 set so that it runs close to the ground to cut the tops off the plants. The blade is set obliquely to the line of travel so that it operates with a draw cut.

Above the blade 18 is arranged a rake 19 for carrying off to one side of the machine the parts cut off by the blade. The rake is also set obliquely to the line of travel of the machine, but in an opposite direction so that the blade and the rake cross, as shown in Fig. 1. The blade is positioned beneath the rake in close proximity to the downwardly extending teeth thereof, and the latter therefore also serve to hold the tops of the plants while they are being severed by the blade.

The cutting and rake mechanism hereinbefore described is located between two rolling colters or disk plows 20, the latter running along the sides of the rows of plants so that they loosen the soil and throw the plants inward to be picked up by a digger. These disks are carried by the lower ends of the front uprights 16, the same being formed with axle spindles $15^a$ as shown in Fig. 6.

The blade 18 is attached at one end to an inturned bracket arm $16^b$ carried by one of the spindles $15^a$, and a similar bracket arm $16^c$ of the other spindle supports one end of the rake 19. The blade 18 has a loop $18^a$ by which latter and a set screw $18^b$ it is fastened to the part $16^b$. The cross bar carrying the teeth of the rake 19 has a depending stem at one end which seats and is held in the socketed extremity of the part $16^c$ by a set screw $19^a$. The blade 18 is also fastened intermediate its ends to the cross bar of the rake 19 by a stem 21 passing through the rake cross bar and through a cross bar 21ᵃ connecting the front uprights 16, said stem being bolted or otherwise fastened to the latter cross bar.

The plants are lifted out of the ground by a digging mechanism consisting of a series of digger teeth 22 extending downward and forwardly from a plate 22ᵃ so that when the machine is traveling ahead, the teeth enter the ground and lift the plants and deposit the same on the plate 22ᵃ from which they pass to an elevator or conveyer to be presently described. The plate 22ᵃ is carried by the lower ends of the rear uprights 16.

The elevator mechanism hereinbefore mentioned is of the endless belt type, it being composed of slats 23 carried by the chains 23ᵃ. The slats are triangular in cross section and set closely together forming transverse grooves to hold the plants. The elevator extends rearward with an upward inclination, and its rear end discharges the plants into a receptacle 24 having a hinged bottom 24ᵃ so that its contents may be periodically dumped.

The forward ends of the elevator chains 23ᵃ pass over sprocket wheels 25 carried by the rear uprights 16, and the rear ends of said chains pass over sprocket wheels 26 on a shaft 27 carried by the frame bars 14 and also provided with a pinion 28 meshing with a pinion 29 on the rear axle 30 of the machine, the latter being the drive axle. A suitable clutch 31 is provided for throwing the elevator into and out of gear, this clutch being operated by a hand lever 31ᵃ located alongside the seat 13 so as to be within easy reach of the driver.

The dumping bottom 24ᵃ is controlled by a connection 32 with a hand lever 32ᵃ alongside the driver's seat 13.

The machine is designed for harvesting beets, turnips, onions, potatoes and similar crops. When used for harvesting potatoes or other crops not requiring a topping mechanism, the latter will be removed, leaving only the diggers 22, the elevator, and the receptacle into which the latter discharges, the dumping bottom 24ᵃ being periodically opened to discharge the plants in piles. The cutting and digging mechanism can be vertically adjusted as it is supported by the vertically slidable uprights 16, the adjustment being effected by the hand screw 17.

I claim:—

1. In a harvester of the kind described, a topper comprising a horizontal transversely set blade, and a rake positioned above the blade, said blade and rake being arranged in crossed relation.

2. In a harvester of the kind described, a topper comprising a horizontal transversely set blade, and a rake positioned above the blade, and having depending teeth terminating close to the blade, said blade and rake being arranged in crossed relation.

3. In a harvester of the kind stated, a topper comprising a horizontally positioned blade and a rake above the same, said rake and blade being arranged in crossed relation and obliquely to the line of travel.

4. In a harvester of the kind described, a topper comprising a horizontal transversely set blade, a rake positioned above the blade, said blade and rake being arranged in crossed relation, and a vertically adjustable supporting frame for said blade and rake.

5. In a harvester of the kind described, a topper comprising a horizontal transversely set blade, a rake positioned above the blade, said blade and rake being arranged in crossed relation, and rolling colters between which the rake and the blade are located.

6. In a harvester of the kind described, a topper comprising a horizontal transversely set blade, a rake positioned above the blade, rolling colters between which the rake and the blade are located, said blade and rake being arranged in crossed relation, and a vertically adjustable supporting frame for the blade, the rake and the colters.

In testimony whereof I affix my signature.

WILLIAM BAILEY.

Copies of this patent may be obtained for five cents each, by addressing the "Commissioner of Patents, Washington, D. C."